United States Patent [19]

Jáki et al.

[11] Patent Number: 4,764,768

[45] Date of Patent: Aug. 16, 1988

[54] SIGNAL DISPLAY ELEMENT FOR THE DISPLAY OF MORE, THAN TWO INFORMATIONS FOR SIGNAL DISPLAYS WITH ELECTRO-MAGNETICALLY EXCITED MAGNETIC TILTING PLATES

[75] Inventors: Lászlò Jáki; Sándor Jodál; László Jagicza; József Mandzsu; Endre Pap; János Szebeni, all of Budapest, Hungary

[73] Assignee: Finommechanikai es Elektronikus Muszergyarto Szovetkezet, Hungary

[21] Appl. No.: 932,703

[22] Filed: Nov. 19, 1986

[30] Foreign Application Priority Data

Nov. 19, 1985 [HU] Hungary .............................. 4388/85

[51] Int. Cl.[4] .......................... G01D 5/20; G08B 5/24

[52] U.S. Cl. .......................... 340/815.05; 340/815.26; 116/204; 40/449

[58] Field of Search ............... 340/107, 944, 108, 764, 340/815.15, 815.24, 815.26, 815.29, 815.05, 785, 815.04; 40/449, 462, 600, 621, 530, 531, 532, 534; 116/204; 350/269; 335/285, 280

[56] References Cited

U.S. PATENT DOCUMENTS 2,952,835 9/1960 Aiken .............................. 340/815.24
3,540,038 11/1970 Taylor et al. .................. 340/815.24
3,916,403 10/1975 Mandzsu et al. ............... 340/815.04
4,528,932 7/1985 Ducza et al. .......................... 40/449

FOREIGN PATENT DOCUMENTS 0157250 9/1970 Hungary .
0158828 12/1971 Hungary .

*Primary Examiner*—John W. Caldwell, Sr.
*Assistant Examiner*—Alvin Oberley
*Attorney, Agent, or Firm*—Handal & Morofsky

[57] ABSTRACT

A signal display element for the display of more than two informations by electromagnetically excited tilting plates supported in bearings on a baseplate (1) and containing magnetic parts and adapted to be rotated about an axis of rotation (3), wherein the magnetic axes of the parts of the tilting plates containing the magnets (5) run normal to the plane of the tilting plate, bipolarly excitable field coils are coupled to the tilting plate (4) for controlling the rotation thereof. Parts of the tilting plates (4) containing the magnets (5) are thicker than the non-magnetic parts and the distance between the outer surfaces of the two extreme tilting plates, when the tilting plates (4) are laid on each other on one side of the axis of rotation (3), is equal to the total thickness of the tilting plates, representing the sum of the total thickness of the non-magnetic parts of the tilting plates (4), the number of which is less by one, than the number of all the tilting plates, and the thickness of a magnet (5) of maximal thickness.

7 Claims, 2 Drawing Sheets

SIGNAL DISPLAY ELEMENT FOR THE DISPLAY OF MORE, THAN TWO INFORMATIONS FOR SIGNAL DISPLAYS WITH ELECTRO-MAGNETICALLY EXCITED MAGNETIC TILTING PLATES

FIELD AND BACKGROUND OF THE INVENTION

The present invention relates to a signal display element for the display of more than two informations by electromagnetically excited magnetic tilting plates; the signal display element has a base plate, on the base plate there are the tilting plates provided with a part containing the magnets and the tilting plates are supported in bearings on the baseplate and can be displaced in relation to each other in direction of the axis of rotation; magnetic axes of the parts of the tilting plates containing the magnets are preferably normal to the plane of the tilting plates, furthermore, bipolarly excitable field coils are associated with the tilting plates for the control thereof.

As it is well known, signal display elements used to be applied for displaying numbers, signals and symbols, such as according to Hungarian Pat. No. HU-PS 157 250, they are provided with plates having a magnetic part, to be tilted by electromagnetic control and in such a manner that as a consequence of the tilting motion one face or the other of the plates becomes visible. The plates can be tilted around a lateral edge or an edge being parallel with the lateral edge; the two surfaces of the tilting plates are carrying different informations, for example, they are differently colored, while the part of the baseplate which became visible, is carrying an identical information, e.g. it has the same color, as the surface of the tilting plate which became visible. The tilting plates are made, at least partly, of a permanent magnetic material, the magnetic axis of which is advantageously normal to the plane of the tilting plates. In such a manner two different informations can be displayed with the signal display element.

Furthermore, an element based on the principle of the previously described signal display is known, which is suitable for displaying more than two informations, such a signal display element is specified in Hungarian Pat. No. HU-PS 158 828. In contrast to the earlier solution, with this solution the axes of rotation of the signal display elements are not fixedly supported in bearings, but can be moved in the inside of the U-shaped (hairpin) bearings, when guided, similarly to books resp. covers provided with filler sheets. With this solution a plurality of tilting plates can be arranged in an element and the number of the informations displayed, e.g. of the colors is larger by one, than the number of the tilting plates.

In both solutions thickness of the single tilting plates is determined by the necessary thickness (the necessary magnetic energy content) of the magnets arranged in the tilting plates having a magnetic axis preferably perpendicular to the plane of the tilting plates. Accordingly, with the latter solution containing a plurality of tilting plates, a field coil generating a very strong magnetic field is required on the control side, because, if all the tilting plates are bearing up against each other on one side, the magnetic part of the topmost tilting plate will lie in a significant distance from the magnetic coil exciting it. Furthermore, an increase of the total thickness of the plates will push apart the displaying surface of the adjacent dots in depth, and as a consequence, when viewed at a larger angle of sight, this can be disturbing from the optical viewpoint.

SUMMARY OF THE INVENTION

The object of the present invention is to provide a solution, by the aid of which the difficulties enumerated can be eliminated and, simultaneously, a formation can be ensured for the tilting plates, which enables the production of a signal display system for the display of more; than two informations with an optimal energy consumption.

The invention is based on the recognition, that, if the thickness of the tilting plates, with the exception of the magnetic parts, is reduced to the minimum allowed by the technology, the lightest tilting plates are best suitable to be put into motion, on the other hand it becomes possible to form the single tilting plates in such a manner that the packet of tilting plates comprising the tilting plates should have the minimal thickness, if the non-magnetic parts are bearing up against each other.

The essence of the invention lies in that the parts of the single tilting plates containing the magnets are thicker than the non-magnetic parts thereof. Furthermore, if the tilting plates are collected on one side of the axis of rotation and laid on each other, the distance between the outer surfaces of the two extreme tilting plates, being equal to the total thickness of the tilting plates, represents the sum of the total thickness of the non-magnetic parts of the tilting plates, the number of which is less by one, than the number of all the tilting plates and the total thickness of the part containing the magnet of maximal thickness arranged on one tilting plate together with the tilting plate.

BRIEF DESCRIPTION OF THE DRAWINGS

The invention will be described in details by means of preferred embodiments, by the aid of the drawings enclosed, wherein.

DESCRIPTION OF THE PREFERRED EMBODIMENT

Figure 1:
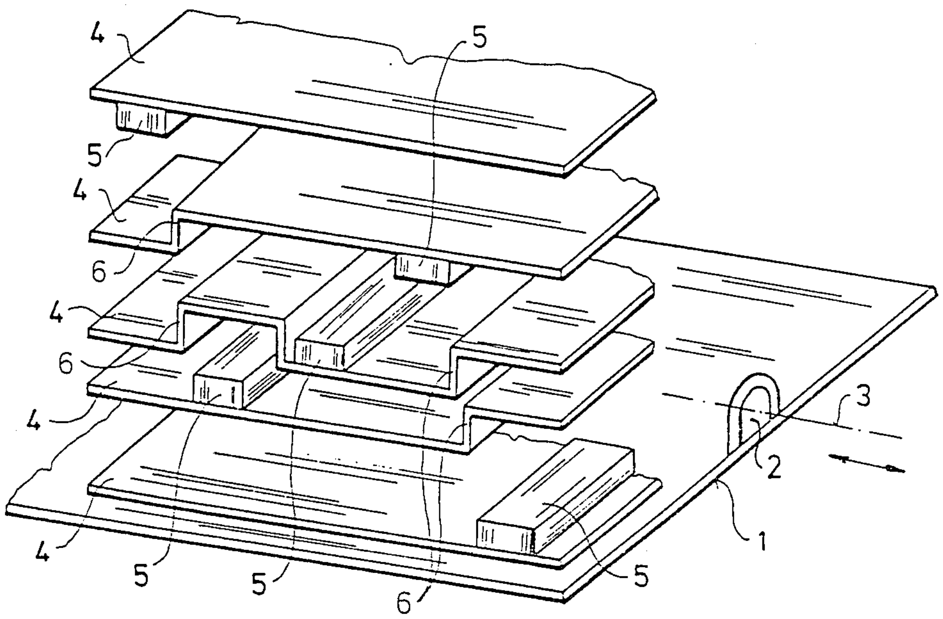
FIG. 1 is an axonometric diagrammatic view of the embodiment of the signal display element according to the invention for the display of six informations.

As can be seen in FIG. 1, in this embodiment of the display element tilting plates 4 are connected to an axis of rotation 3, the axle being rotatable in bearings 2 which are arranged on the base plate 1. Every tilting plate 4 is provided with a part containing a magnet 5, while the other parts are non-magnetic. The magnetic axes of the magnets 5 enclose an angle with the plane of the baseplate 1, and are running preferably perpendicularly to the plane of the base plate 1. The magnets 5 of the tilting plates 4 belonging to one signal display element are displaced in relation to each other in direction of the axis 3 of rotation in such a manner that in the direction perpendicular to the base plate 1 two or more magnets 5 should not cover each other. However, displacement of the magnets 5 need not follow one after the other in tilting plates 4 which are in mutual contact. The bipolarly excitable field coils (not illustrated here) are coupled to the tilting plates 4 in a manner suitable for the control thereof.

Figure 3:
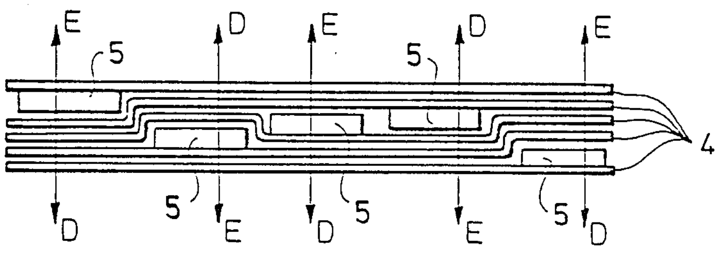
FIG. 3 is another embodiment of the signal display element according to the invention having five tilting plates, in a sectional view taken parallel with the axis of rotation and normal to the base plate.
Figure 4:
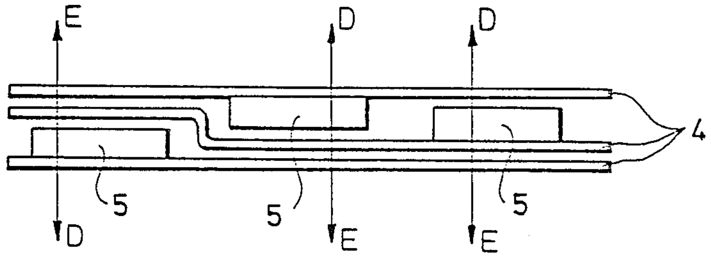
FIG. 4 is a further possible embodiment of the invention having three tilting plates, in a sectional view taken parallel with the axis of rotation and normal to the baseplate.

The parts of the tilting plates 4 containing the magnets 5 are thicker, than the parts of the tilting plates not containing the magnets 5. The parts of the tilting plates 4 not containing a magnet are connected to the parts with the magnet 5 in such a manner, that on one side of a part containing the magnet 5 they form the continuation of the surface of the tilting plate 4 confining the part containing the magnet 5, while on the other side of the part containing a magnets 5, displaced parallel with the former one, they form the continuation of the surface of the other tilting plate 4 confining the part containing a magnet 5. The extreme tilting plates 4 being in direct contact with the base plate 1 form the exception, where the parts containing magnet 5 occupy an extreme position in direction of the axis 3 of rotation. The non-magnetic parts of the tilting plates 4 are connected either only on one side to the part containing the magnet of the extreme tilting plate 4, or, as can be seen in FIGS. 3 and 4, they are connected to both sides of the parts containing the magnet 5, but in the same plane, as a continuation of the outer surface of the parts containing magnet 5. As a consequence, the surfaces of the extreme tilting plates 4 being in contact with the base plate 1 are planar surfaces without any staggering in their whole extension.

From the point of view of the present specification those portions of the tilting plates 4 are considered as staggered, where the planes of the non-magnetic parts of the tilting plates 4 are displaced in planes parallel with themselves. Such a staggering 6 is formed not only when between the non-magnetic parts of the tilting plates 4 a magnet 5 is arranged. It becomes also possible to form a staggered part directly between the non-magnetic parts of the tilting plates 4. FIG. 1 illustrates this case, showing a staggered part between all three intermediate tilting plates 4.

In order to achieve that the parts of the tilting plates 4 containing the magnets 5 should not cover each other perpendicularly to the base plate 1, dimension of the parts incorporating the magnets 5 is to be chosen so, that it should be less than the part, obtained by dividing the full length of the tilting plates in the direction of the axis of rotation 3 by the number of the tilting plates 4.

The magnets 5 can be synthetic magnets on ferrite base, which can be produced together with the synthetic non-magnetic parts by injection moulding.

By forming the proper staggering parts it can be achieved that total thickness of the tilting plates 4 contained in one signal display element should not surpass the necessary minimum. This total thickness represents the distance between two extreme tilting plates (i.e. the outer surfaces thereof), when the tilting plates 4 are accumulated and laid on each other on one side of the axis of rotation, which corresponds, assuming the optimal case in sense of the invention, to the sum of the total thickness of the non-magnetic parts of the tilting plates 4, the number of which is less by one, than the total number of the tilting plates, and of the thickness of a magnet 5 of maximal thickness having been arranged on a tilting plate 4 together with the tilting plate. If the display element contains but two tilting plates 4, total thickness is defined as the total thickness of the part of one of the tilting plates 4 containing the magnet 5 and of the non-magnetic parts of the other tilting plate 4. In practice this total thickness is always larger, than the theoretical thickness, due to the surfacial unevennes and the unavoidably occuring air gaps.

Figure 2:
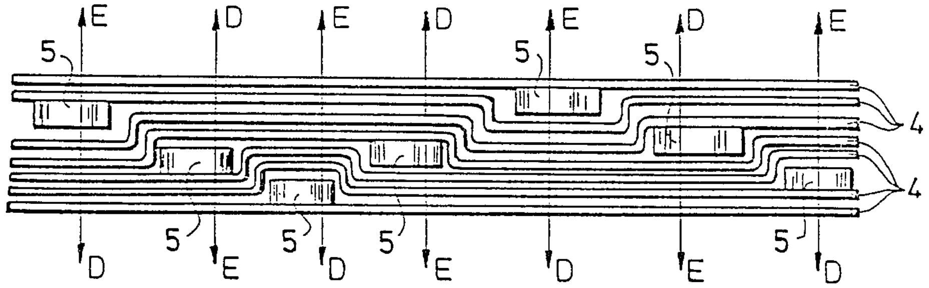
FIG. 2 is the sectional view (normal to the baseplate and parallel with a axis of rotation) of the signal display element according to FIG. 1.

According to the sectional view of FIG. 2 of the tilting plates 4 following each other, when advancing to the direction of the axis 3, the parts containing the magnets 5 do not follow exactly one after the other. However, the polarity of the magnets 5 following one another in direction of the axis 3 is always opposite, independent on the fact, to which tilting plate they belong.

FIG. 3 shows a signal display element for the display of eight informations, provided with five tilting plates 4. For the sake of better understanding every second tilting plate 4 is provided with a marking different from that of the others, however, identical with each other.

For the sake of order it should be mentioned that in a signal display element containing more than two tilting plates 4, the parts containing the magnet 5 can follow one another in a different order of sequence, when advancing in the direction of the axis of rotation 3. For example, the solution according to FIG. 4 having three tilting plates 4, the part containing the magnet 5 and arranged on the topmost (extreme) tilting plate 4, can transferred to the right edge of the topmost tilting plate 4, while the part of the middle tilting plate 4 containing the magnet 5 can be displaced to the centre of the middle tilting plate 4. However, it should be clear that in this case it seems to be expedient to change the polarity in the magnets 5 arranged on the given tilting plate 4.

The invention is not restricted to the solutions described herein but it encompasses all the solutions according to the claims, in particular according to the main claim.

What we claim:

1. A signal display element for displaying more than two informations comprising electromagnetically excitable magnetic tilting plates, a base plate, said tilting plates being supported in bearings on the base plate for rotation about an axis of rotation, said tilting plates containing parts including magnets being offset with respect to magnets of an adjacent plate in the direction of the axis of rotation, wherein the magnetic axes of the magnets run substantially normal to the plane of the associated tilting plate, bipolarly excitable field coils coupled to the tilting plates for the rotational control thereof, the parts of the tilting plates containing the magnets are thicker than the non-magnetic parts of the tilting plates, the distance between the outer surfaces of the two outermost lying tilting plates when the tilting plates are stacked and laid on each other on one side of the axis of rotation is equal to the total thickness of the non-magnetic parts of the tilting plates less by one than the number of all the tilting plates, and of the thickness of a magnet having maximal thickness and arranged on a tilting plate taken together with that tilting plate.

2. The signal display element as claimed in claim 1, wherein the outer surfaces of the two outermost lying tilting plates in contact with the base plate are straight plane surfaces over their full extent.

3. The signal display element as claimed in claim 2, wherein if more than two tilting plates are contained in a stack, the tilting plate placed between the two outermost lying plates comprise a staggered portion emerging from a general plane of the tilting plate, said staggered portion being directed perpendicular to the axis of rotation to an extent corresponding to thickness of the part of the tilting plate containing the magnet and of the non-magnetic part.

4. The signal display element as claimed in claim 1, wherein the width of the parts of the tilting plates containing a magnet is less than the part of the length of the tilting plate lying in the direction of the axis of rotation divided by the number of the tilting plates.

5. The signal display element as claimed in claim 1, wherein the non-magnetic parts of the tilting plates are made of a synthetic material.

6. The signal display element as claimed in claim 1, wherein the parts of the tilting plates containing the magnets are prepared by injection molding as a monolithic unit.

7. The signal display element as claimed in claim 1, wherein the parts of the tilting plates containing the magnets are synthetic magnets on a ferrite base.

* * * * *